Patented Apr. 30, 1946

2,399,601

UNITED STATES PATENT OFFICE 2,399,601

SUBSTITUTED IMIDAZOLES

Lucas P. Kyrides, Webster Groves, and Ferdinand B. Zienty, St. Louis, Mo., assignors to Monsanto Chemical Company, St. Louis, Mo., a corporation of Delaware No Drawing. Application April 15, 1943, Serial No. 483,172

4 Claims. (Cl. 260—309.6)

The present invention relates to the production of new therapeutic agents and insecticide toxicants which are substituted imidazole compounds and comprises the method of producing these compounds as well as the new products themselves.

According to the present invention generally stated, new products which are valuble in the treatment of various diseases are made by preparing 2-alkyl and 2-alkenyl imidazoles having the formula:

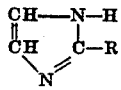

in which R represents an acyclic hydrocarbon radical having from 13 to 14 carbon atoms in its structure. The acyclic hydrocarbon radical may be composed of a single straight chain such as the n-tridecyl and n-tetradecyl radicals or the unsaturated n-tridecenyl and n-tetradecenyl radicals. Likewise, the acyclic hydrocarbon radical may be a branched chain isomer of these radicals having a structure in which at least 10 carbon atoms are in one chain. The remainder of the carbon atoms to make up the total of 13 or 14 carbon atoms may be in one or more side chains attached to the long chain at any of the positions in the chain. Furthermore, in the unsaturated hydrocarbon radicals, the unsaturated condition as represented by one or more double bonds may be at any of the positions in the chain. The examples which follow will serve to illustrate some of the various positions. Other branched chain isomers having from 13 to 14 carbon atoms with at least 10 carbon atoms in a long chain, when substituted in the 2-position of imidazole, as represented by the formula hereinbefore provided, are contemplated as within the scope of the present invention. The water-soluble salts of these compounds may be prepared and are also valuable therapeutic agents. For example, the hydrochlorides, hydrobromides, acetates and other salts may be employed.

The new products and their water-soluble salts may be administered orally or parenterally and have been found to be unusually effective in the treatment of various diseases. The acid salts may be prepared by dissolving the products in an aqueous solution containing the stoichiometrical equivalent of a suitable acid such as hydrochloric, hydrobromic and acetic acids and the solution may be employed for parenteral administration. Also the acid salts may be prepared during the syntheses of the imidazole derivatives or immediately thereafter and before the products are isolated from the reaction mixture.

The products of the present invention have also been found to possess utility as insecticides and as toxicants for insecticide compositions, such as sprays and powders, in which the compounds are blended with suitable wetting agents, fillers, solvents, adhesives, coating agents, repellents and other ingredients employed in compounding insecticides.

The products of the present invention may be prepared by reacting ethylene diamine with a molecular equivalent of an acylating agent comprising an aliphatic monocarboxylic acid having as its alkyl or alkenyl residue one of the residues described hereinbefore in the definition of R with respect to the formula. The acid thus employed will be composed of an alkyl or alkenyl residue of the proper chain length or with the proper branched chain components, together with a carboxylic acid group, the carbon of which is not included in the contemplation of the chain length hereinbefore described. In place of the acid, the alkyl ester, such as the butyl ester, or desirably the methyl or ethyl ester, may be employed, or the acyl halide, such as the acyl chloride.

The resulting acyl amino derivative is then condensed with the aid of a suitable mild dehydrating agent, such as powdered calcium oxide, to form the 2-alkyl (or 2-alkenyl) imidazoline. The derivative thus prepared is then dehydrogenated with the aid of a suitable dehydrogenation catalyst, such as nickel, to form the 2-alkyl (or 2-alkenyl) imidazole.

The following examples illustrate the process of the present invention and the new compounds resulting therefrom. These examples are to be construed as merely illustrative and not as limiting the scope of the present invention.

EXAMPLE I 2-n-tridecyl-imidazole

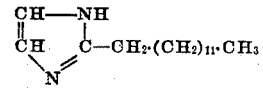

A mixture of 426 grams (1.5 moles) of n-butyl myristate and 270 grams (4.5 moles) of anhydrous ethylene diamine was refluxed at 115° C. for 10 hours. The excess ethylene diamine and the butanol resulting from the acylation were then distilled off, the distillation being completed at a reduced pressure of 10 mm. The crude product remaining in the still weighed 377 grams and melted at about 122° C. with extensive previous softening. After recrystallization from alcohol, the melting point was 150°-152° C. The product was identified as N-n-tetradecanoyl ethylene diamine; the product was found to be appreciably soluble in benzene.

A mixture of 270 grams (1 mole) of the crude product described in the foregoing paragraph and 280 grams (5 moles) of powdered calcium oxide was heated with agitation at 225°-230° C. for 36 hours. The mixture was then cooled and extracted with alcohol. The solvent was removed from the extract by evaporation, leaving 130 grams of crude amine base. The base was distilled, yielding 70 grams of a pale yellow, crystalline, waxy solid material identified as 2-n-tridecyl imidazoline (2-n-tridecyl-4,5-dihydroimidazole); M. P., 87°-88° C. with slight previous softening. In place of distillation, the crude base may be recrystallized from benzene, alcohol, dioxane or a petroleum naphtha solvent. However, a pure product was difficult to obtain in this manner. The small residue of uncondensed N-n-tetradecanoyl ethylene diamine which was extracted from the condensation reaction mixture by the alcohol together with the 2-n-tridecyl imidazoline was left in the still after distillation of the imidazoline.

In place of calcium oxide, other suitable dehydrating agents, such as other alkaline-earth oxides, for example, barium oxide and magnesium oxide, and other mild dehydrating agents, may be employed. However, calcium oxide is the desired agent because of its cheapness and efficiency.

For the dehydrogenation of 2-n-tridecyl imidazoline, a nickel catalyst was prepared by heating nickel formate in a mineral oil until decomposition of the formate occurred. The nickel catalyst may be prepared by other methods, for example, the method disclosed in U. S. Patent No. 1,378,336, issued May 17, 1921, to Ellis. Other suitable dehydrogenation catalysts, such as Raney nickel catalysts, may be employed. One gram of the catalyst thus prepared was mixed with 18.9 grams of 2-n-tridecyl imidazoline and the mixture was heated with agitation to 225°-235° C. until hydrogen was no longer evolved. The reaction mixture was cooled to 125° C. and ½ gram of the nickel catalyst was added. Heating was resumed and continued until the evolution of hydrogen ceased. The reaction mixture was then distilled in vacuo; B. Pt. 230°-235° C./7 mm. The distilled product, upon cooling, was a yellow solid and was identified as 2-n-tridecyl-imidazole; M. P. 80°-81° C.

EXAMPLE II 2-n-tridecen-1-yl-1-imidazole

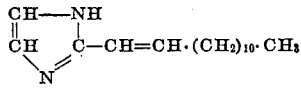

Two hundred ninety-six (296) grams of freshly distilled myristic acid (1.6 moles) was melted and poured into a one-liter round-bottomed 3-necked flask equipped with a mechanical stirrer, a reflux condenser (containing a thermometer) and a dropping funnel. One hundred thirty-six (136) cc. of bromine (2.66 moles) was added slowly to the acid, the rate of addition being adjusted so that the temperature remained at approximately 60° C. After the addition of bromine, the mixture was heated to approximately 50°-60° C. and maintained at that temperature for two hours. The reaction mixture was then allowed to stand overnight. The flask containing the reaction mixture was placed in an ice-salt bath. To this mixture was added, with agitation, 250 cc. of water. The temperature rose rapidly to approximately 90° C. and the excess bromine was evolved. After the reaction had subsided, the mixture was heated at approximately 60° C. for about two hours. The aqueous layer was removed by decantation and the residual layer was washed with 250 cc. of water. The washed residue was heated for two hours at a temperature of approximately 50°-70° C. and thereafter was cooled and dissolved in 300 cc. of ether. The ether solution was washed five times with 100 cc. portions of water. The washed ether solution was dried overnight over anhydrous calcium chloride. The anhydrous ether solution was heated on the steam bath to remove the ether. A yield of 328.1 grams of α-bromo-myristic acid (82% based on myristic acid) was obtained.

A mixture of 61 grams (.198 mole) of α-bromo-myristic acid and 51.6 grams (.4 mole) of quinoline was heated at 200° C. for five hours in a 500 cc. 3-necked flask with stirring. To the reaction mixture 40 grams of 50% caustic soda solution was added, thereby causing the quinoline to separate out. The quinoline was extracted from the reaction mixture with 200 cc. benzene; a second extraction of the reaction mixture was performed with 200 cc. of ether. The residue was then washed with water. An aqueous solution of 50 cc. of concentrated hydrochloric acid in 50 cc. of water was added to the residue. The mixture was then extracted with 100 cc. of chloroform, using 25 cc. portions for the extractions. The chloroform layer was separated from the mixture and distilled to remove the hydrochloric acid. The resulting residue was identified as 2-tetradecenoic acid. The yield was 26.6 grams (59.4% based on α-bromo-myristic acid). The melting point of the crude acid was found to be 50°-53° C. (uncorrected). This acid, 2-tetradecenoic acid, having the formula

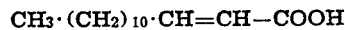

is a new compound. Its alkyl esters, salts and halide derivatives are also new compounds.

In place of quinoline, other suitable amines, such as dimethyl aniline or any of the quinaldines, may be employed.

An alkyl ester, such as the methyl or ethyl ester, of 2-tetradecenoic acid, was prepared and reacted by the method of Example I with a molecular equivalent of ethylene diamine to form N-n-tetradecen-2-oyl ethylene diamine having the formula

The imidazoline derivative and the corresponding imidazole derivative may be prepared from the N-acyl-ethylene diamine by the method of Example I.

EXAMPLE III 2-(1',1'-dimethyl-dodecyl-1)-imidazole

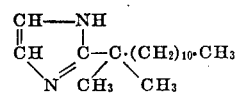

This derivative may be prepared according to the method of Example I, using an alkyl ester of α,α-dimethyl-tridecanoic acid, such as the methyl or ethyl ester, in place of the n-butyl ester of myristic acid.

Example IV

2-(α-methyl-dodecen-11-yl-1)-imidazole

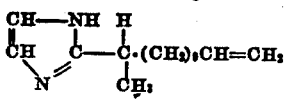

This derivative may be prepared according to the method of Example I, using an alkyl ester, such as the methyl or ethyl ester, of 2-methyl-12-tridecenoic acid in place of n-butyl myristate.

Example V

2-(tetradecen-13-yl-1)-imidazole

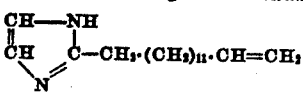

This derivative may be prepared according to the method of Example I, using an alkyl ester, such as the methyl or ethyl ester, of 14-pentadecenoic acid in place of n-butyl myristate.

Example VI

2-n-tetradecyl-imidazole

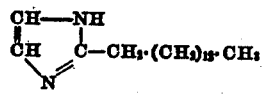

This derivative may be prepared according to the method of Example I, using an alkyl ester, such as the methyl or ethyl ester, of n-pentadecanoic acid in place of n-butyl myristate.

Example VII

2-tetradecen-12-yl-1-imidazole

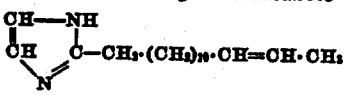

This derivative may be prepared according to the method of Example I, using an alkyl ester, such as the methyl or ethyl ester, of 13-n-pentadecenoic acid in place of n-butyl myristate.

Example VIII

2-n-tridecen-8-yl-1-imidazole

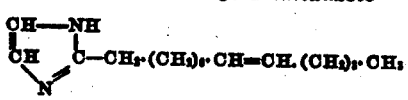

This derivative may be prepared according to the method of Example I, using an alkyl ester, such as the methyl or ethyl ester, of 9-tetradecenoic (myristoleic) acid in place of n-butyl myristate.

Other 2-alkenyl derivatives of imidazole are contemplated as within the scope of the present invention in which the substituent in the 2-position of the imidazole residue is in conformity with the definition of R as hereinbefore described, for example, derivatives in which the double bond in the 2-alkenyl radical occurs in positions other than those illustrated in the foregoing examples. Likewise, the branching in the straight chain of the 2-alkyl or 2-alkenyl substituent of the imidazole derivative may occur in positions other than those illustrated in the foregoing examples.

As illustrative of the therapeutic utility of the compounds of the present invention, the following data on the results obtained with 2-n-tridecyl imidazole in tests conducted on two-week old ducklings inoculated with large numbers of malaria germs, *P. lophurae*, are given as follows:

|  | n-Tridecyl-imidazole-2 | n-Tridecyl-imidazo-line-2 | Quinine bisulfate | Untreated controls |
|---|---|---|---|---|
| Dose (mgm./kg.) | 100 | 100 | 25 | |
| No. of birds | 5 | 5 | 5 | 5 |
| Antimalarial activity | +++ | None | +++ | |

(All drugs were administered twice daily for 5 days.)

In addition to the aforedescribed therapeutic application, other therapeutic applications of the derivatives of the present invention have been made with desirable results in instances in which results were not predictable.

We claim:

1. The 2-tridecyl-imidazole of the formula:

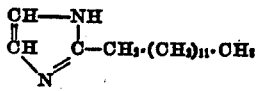

prepared for use as a therapeutic agent.

2. The 2-tetradecyl-imidazole of the formula:

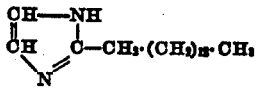

prepared for use as a therapeutic agent.

3. Imidazole derivatives of the formula type

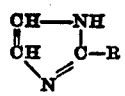

in which R represents a straight-chain alkyl hydrocarbon radical having from 13 to 14 carbon atoms, and acid salts thereof, prepared for use as therapeutic agents.

4. A process for preparing therapeutic agents of the formula type.

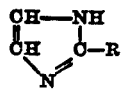

in which R represents a straight-chain alkyl hydrocarbon radical having from 13 to 14 carbon atoms, comprising reacting ethylene diamine with an alkyl ester of a monocarboxylic acid in which a carboxyl group is attached to a straight-chain alkyl hydrocarbon radical having from 13 to 14 carbon atoms, recovering the N-acyl ethylene diamine derivative thus formed, heating said derivative in the presence of a mild dehydrating agent, recovering the reaction product, heating said reaction product with a dehydrogenation catalyst and recovering the dehydrogenation product by distillation.

LUCAS P. KYRIDES.
FERDINAND B. ZIENTY.